United States Patent [19]

Kawakita

[11] Patent Number: 5,604,558
[45] Date of Patent: Feb. 18, 1997

[54] AUTOMATIC FILM CARTRIDGE EJECTION DEVICE OF A CAMERA

[75] Inventor: Katsuya Kawakita, Tokyo, Japan

[73] Assignee: Canon Kabushiki Kaisha, Tokyo, Japan

[21] Appl. No.: 429,880

[22] Filed: Apr. 27, 1995

[30] Foreign Application Priority Data

May 9, 1994 [JP] Japan ..................................... 6-117431

[51] Int. Cl.⁶ ............................ G03B 17/02; G03B 17/26
[52] U.S. Cl. ............................ 396/538; 396/512; 396/387
[58] Field of Search ................................. 354/173.1, 174, 354/275, 288; 352/74

[56] References Cited

U.S. PATENT DOCUMENTS

| 4,145,126 | 3/1979 | Bagby et al. ............................... 352/74 |
| 5,049,914 | 9/1991 | Dassero ................................... 354/288 |
| 5,155,514 | 10/1992 | Tamamura ............................... 354/174 |
| 5,159,365 | 10/1992 | Takahashi et al. ....................... 354/275 |
| 5,258,793 | 11/1993 | Tsuji et al. ................................ 354/288 |
| 5,323,201 | 6/1994 | Richiuso et al. ......................... 354/288 |
| 5,351,102 | 9/1994 | Tsuji et al. ................................ 354/106 |
| 5,430,515 | 7/1995 | Lawther et al. .......................... 354/275 |
| 5,477,295 | 12/1995 | Lawther et al. .......................... 354/275 |

FOREIGN PATENT DOCUMENTS

3-290638 12/1991 Japan .

*Primary Examiner*—A. A. Mathews
*Attorney, Agent, or Firm*—Fitzpatrick, Cella, Harper & Scinto

[57] ABSTRACT

A device such as a camera adapted for an image recording medium cartridge includes a first device for automatically performing an operation relating to at least one of loading and unloading of the cartridge and a second device for varying an operation of the first device according to a loading or unloading direction of the cartridge.

19 Claims, 11 Drawing Sheets

AUTOMATIC FILM CARTRIDGE EJECTION DEVICE OF A CAMERA

BACKGROUND OF THE INVENTION

1. Field of the Invention

The present invention relates to an improvement in an automatic film cartridge ejection device of a camera, etc. for automatically ejecting a loaded film cartridge.

2. Description of the Related Art

Japanese Unexamined Patent Publication No. 3-290638 proposes a device for preventing a film cartridge ejected from a camera from falling out. This device prevents the falling-out of the film cartridge by providing a locking means to control an opening operation of a cover of a cartridge chamber when a doorway of the cartridge of the camera faces downward.

However, when such a conventional device is applied to a camera in which a motor is used to open the cover of the cartridge for the purpose of improving operability, the motor may be driven in a locked state. In that case, a heavy-current is wasted and an inner mechanism of the camera is overloaded, thereby causing a breakage thereof.

SUMMARY OF THE INVENTION

According to one aspect of the present invention, there is provided a device adapted for an image recording medium cartridge which comprises first means for automatically performing an operation relating to at least one of loading and unloading of the cartridge, and second means for varying an operation of the first means according to a loading or unloading direction of the cartridge so as to prevent the falling-out of the above cartridge when loading or unloading without damaging the first means.

Other aspects of the present invention will become apparent from the following description of the preferred embodiment.

DETAILED DESCRIPTION OF THE PREFERRED EMBODIMENTS

An embodiment of the present invention will be described with reference to the accompanying drawings.

Figure 1:
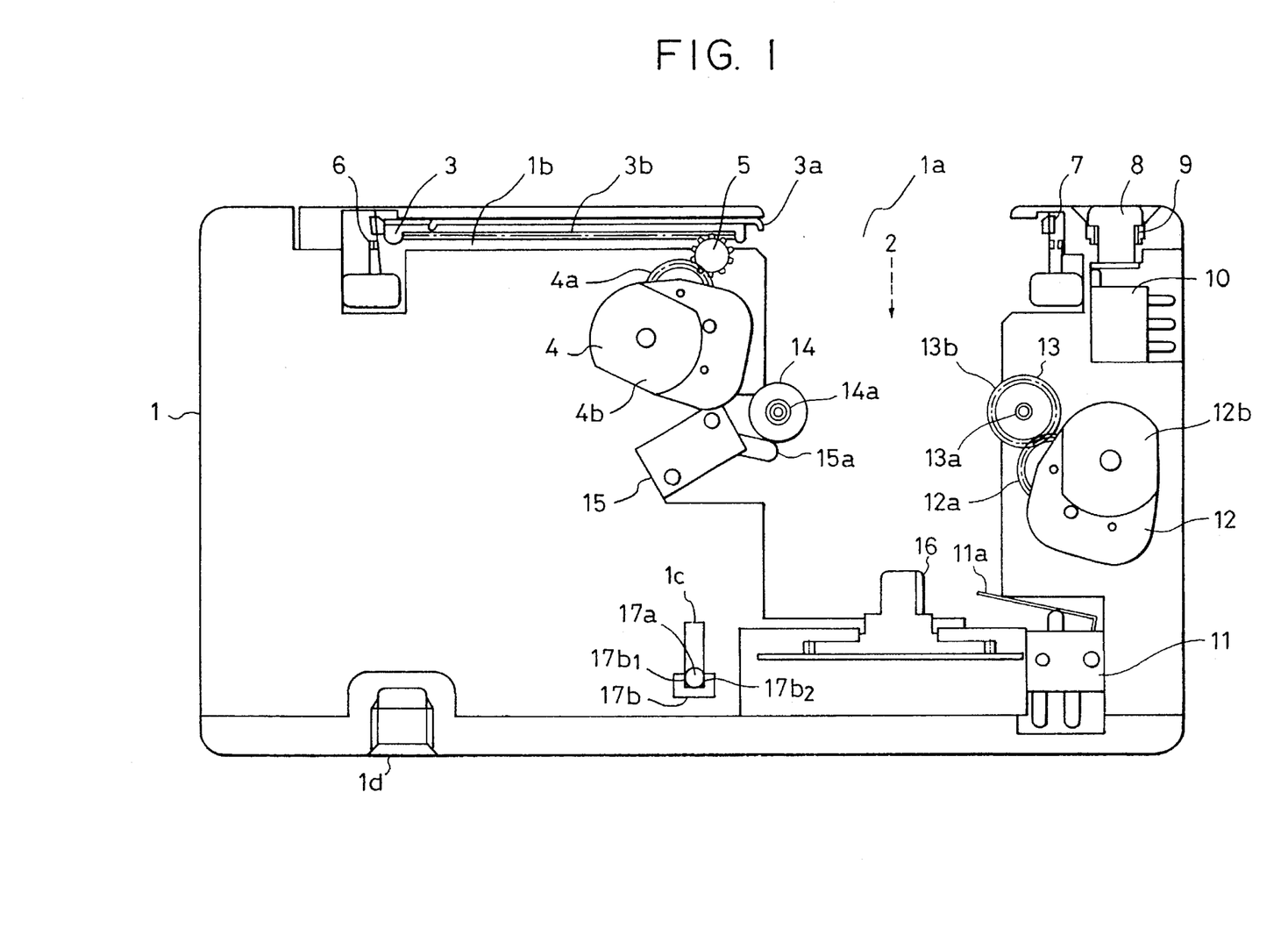
FIG. 1 is a cross-sectional view of a camera having a film cartridge loading device according to an embodiment of the present invention.

FIG. 1 is a cross-sectional view of a camera having a film cartridge loading device according to an embodiment of the present invention.

Referring to FIG. 1, an insertion (removal) hole 1a of a film cartridge 2 containing a film as an image recording medium is formed at the upside section of a camera body 1 and a tripod taphole 1d for mounting a tripod thereto is provided in the bottom surface of the camera body 1. There is a slide space 1b at the upside interior of the camera body 1 into which a slide cover 3 is inserted. The four sides of the rectangular slide cover 3 are bent inwardly to become shade ribs 3a, and racks 3b for opening/closing the slide cover 3 are notched in the slide cover 3. Output of a cover motor 4b of a cover driving unit 4 is decelerated to be output from an output gear 4a. The output gear 4a drives a gear 5 staying in mesh with the racks 3b to open/close the slide cover 3 from side to side.

When the slide cover 3 is driven to the left (opening direction) and the left end thereof abuts against an opening switch 6, the opening switch 6 is turned on to detect that the slide cover 3 is completely opened. Conversely, when the slide cover 3 is driven to the right (closing direction) and the right end thereof abuts against a closing switch 7, the closing switch 7 is turned on to detect that the slide cover 3 is completely closed.

An eject button 8 is a switch to be pushed when the film cartridge 2 is taken out. An eject button 8 is movable in a downward vertical direction, and held at a stand-by position by means of a coil spring 9 which urges the button 8 upwardly. An ejection switch 10 is turned on with a push of the eject button 8. When the film cartridge 2 is inserted from the insertion hole 1a and completely loaded to a predetermined position, an arm 11a of a detection switch 11 is pushed downwardly to turn on the detection switch 11.

Output of a roller motor 12b of a roller driving unit 12 is decelerated with the gear ratio best suited to an application to output from an output gear 12a. A roller 13 for pulling-in and delivery of the film cartridge 2 is composed of a cylinder formed by a silicon rubber and a roller gear 13 meshed with the output gear 12a, and is press-fitted and secured to a roller shaft 13a. A guide roller 14 is similarly press-fitted to a short roller shaft 14a. These two rollers 13 and 14 are designed to have a predetermined outer diameter after being press-fitted to the shafts 13a and 14a, respectively. The outer diameter is set enough to lower or elevate the film cartridge 2 by a normal/reverse rotation of the roller 13 following a compression of a rubber section thereof to a predetermined amount under a condition where the film cartridge 2 is inserted into a cartridge chamber formed at a lower space of the insertion hole 1a. Moreover, the outer diameter is set so as to produce friction sufficient enough to prevent the film cartridge 2 from falling out. Furthermore, two rollers 13 and 14 are designed to slip so as to prevent damage to a driving system when a heavy load is applied.

A position sensing switch 15 senses the insertion and completion of the delivery of the film cartridge 2 by means of a sensing arm 15a projecting by a predetermined amount into the cartridge chamber. The sensing arm 15a is positioned at a somewhat innermost section between the roller 13 and the guide roller 14.

The camera body 1 is provided with an attitude sensing means 17, and a steel ball 17a, which is a sensing material that can move up and down within a vertically extending space 1c. At the lower end of the space 1c, a photo-interrupter 17b having an LED phototransmitting section $17b_1$ and a light receiving section $17b_2$ is provided.

The steel ball 17a moves within the space 1c by gravity in accordance with the attitude of the camera body 1. When the steel ball 17a reaches the bottom of the space 1c, a light is shielded so that the light receiving section $17b_2$ cannot receive the light. However, the light receiving section $17b_2$ can receive the light when the steel ball 17a moves upwardly. A case where the light receiving section $17b_2$ cannot receive the light is taken as Hi level and a case where the light receiving section $17b_2$ can receive the light is taken as Lo level. The attitude of the camera can be sensed in accordance with the Hi level or Lo level of the light receiving output of the light receiving section $17b_2$. When the attitude sensing means 17 senses that the insertion hole 1a of the film cartridge 2 faces downward, falling of the film cartridge 2 can be prevented by prohibiting the opening of the slide cover 3 and delivery of the film cartridge 2 due to the roller 13 even if the eject button 8 is pushed.

Figure 2:
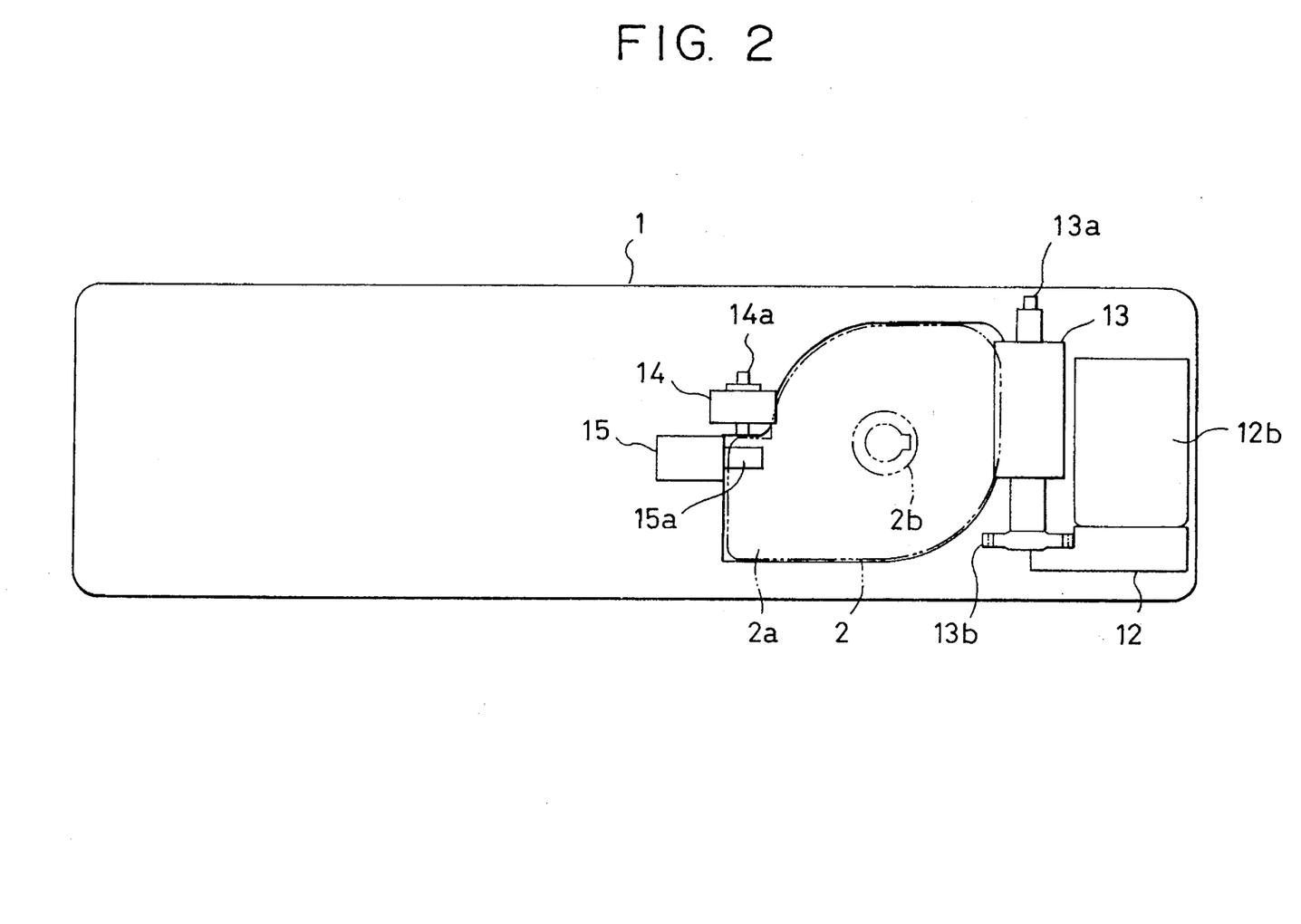
FIG. 2 illustrates arrangements of the film cartridge, the position sensing switch and each of the rollers of the camera shown in FIG. 1.

FIG. 2 shows arrangements of the film cartridge, the position sensing switch and each of the rollers of the camera shown in FIG. 1 viewed from the lower surface of the camera.

Referring to FIG. 2, the roller 13 and the guide roller 14 are placed on opposite sides of the film cartridge 2, and the detection arm 15a is positioned so as to abut against a section 2a of the film cartridge 2.

Figure 3:
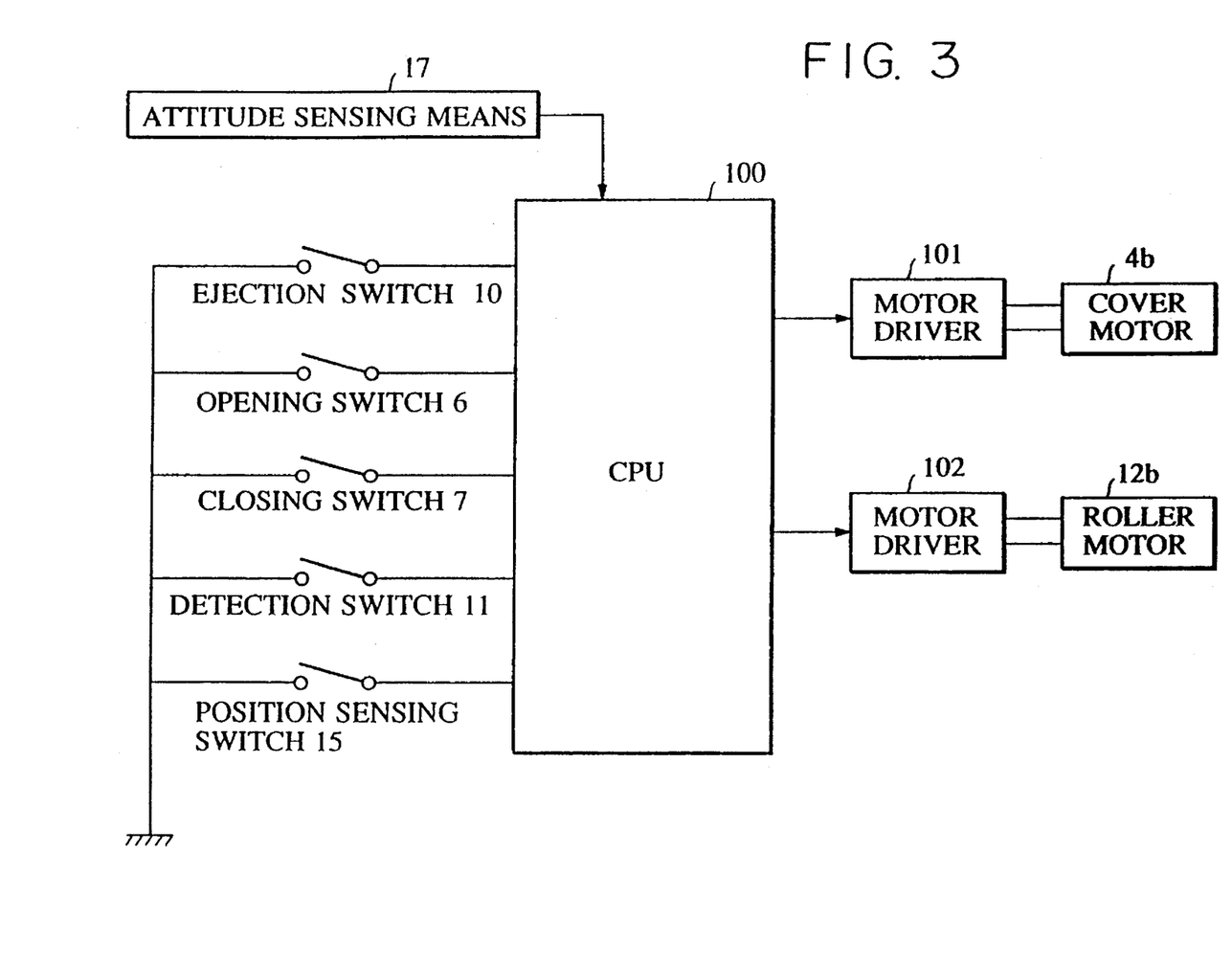
FIG. 3 is a block diagram showing the electrical configuration of the camera shown in FIG. 1.

FIG. 3 is a block diagram showing the electrical configuration of the camera shown in FIG. 1.

Each of the signals from the ejection switch 10, the opening switch 6, the closing switch 7, the position sensing switch 15, the detection switch 11 and the attitude sensing means 17 are transmitted to a CPU 100 to be interpreted, and driving of the cover motor 4b and the roller motor 12b is controlled by control signals from the CPU 100 through the motor drivers 101 and 102.

Figure 4:
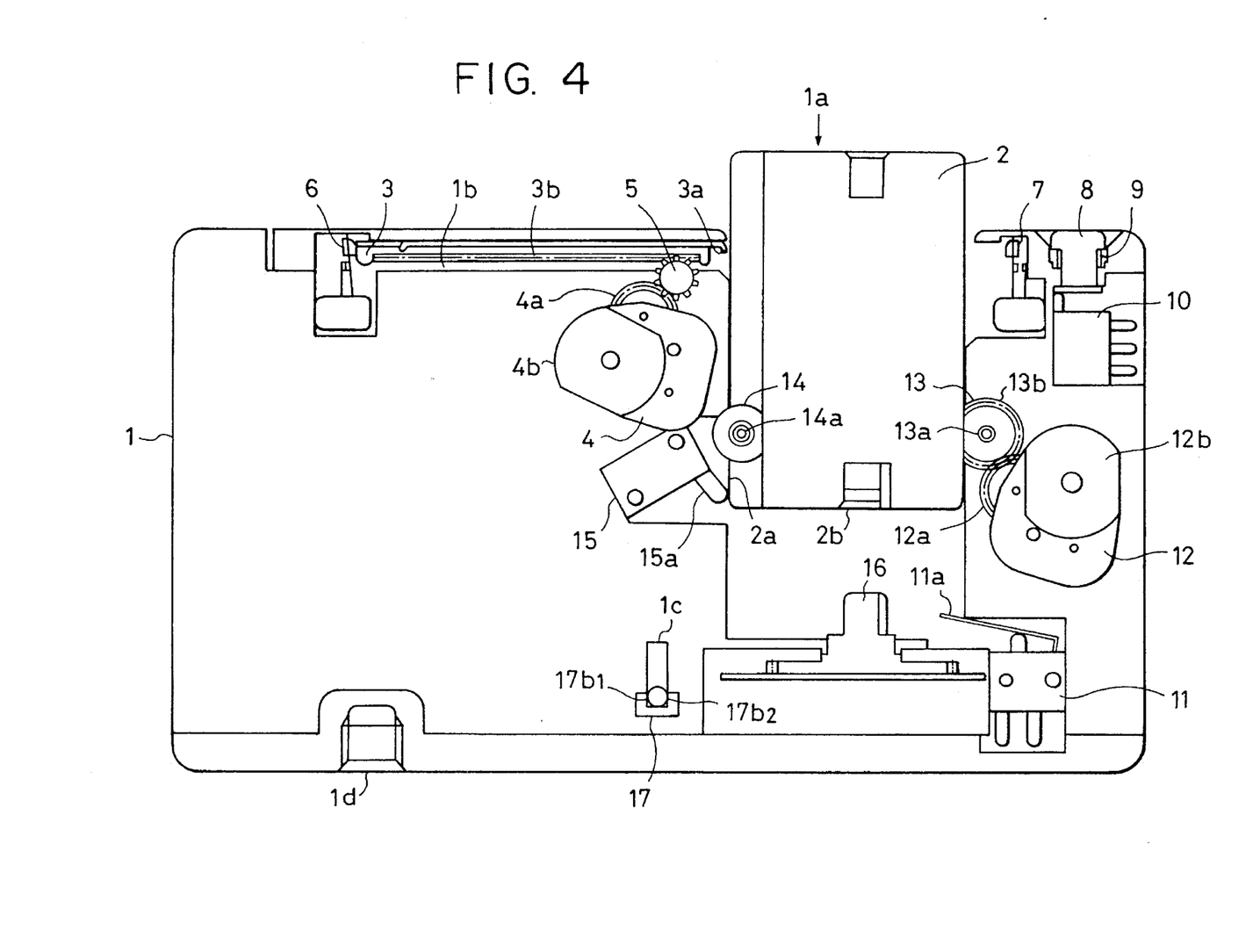
FIG. 4 illustrates a state in which the film cartridge of the camera shown in FIG. 1 is inserted.

FIG. 4 shows a state in which the film cartridge is inserted.

Figure 5:
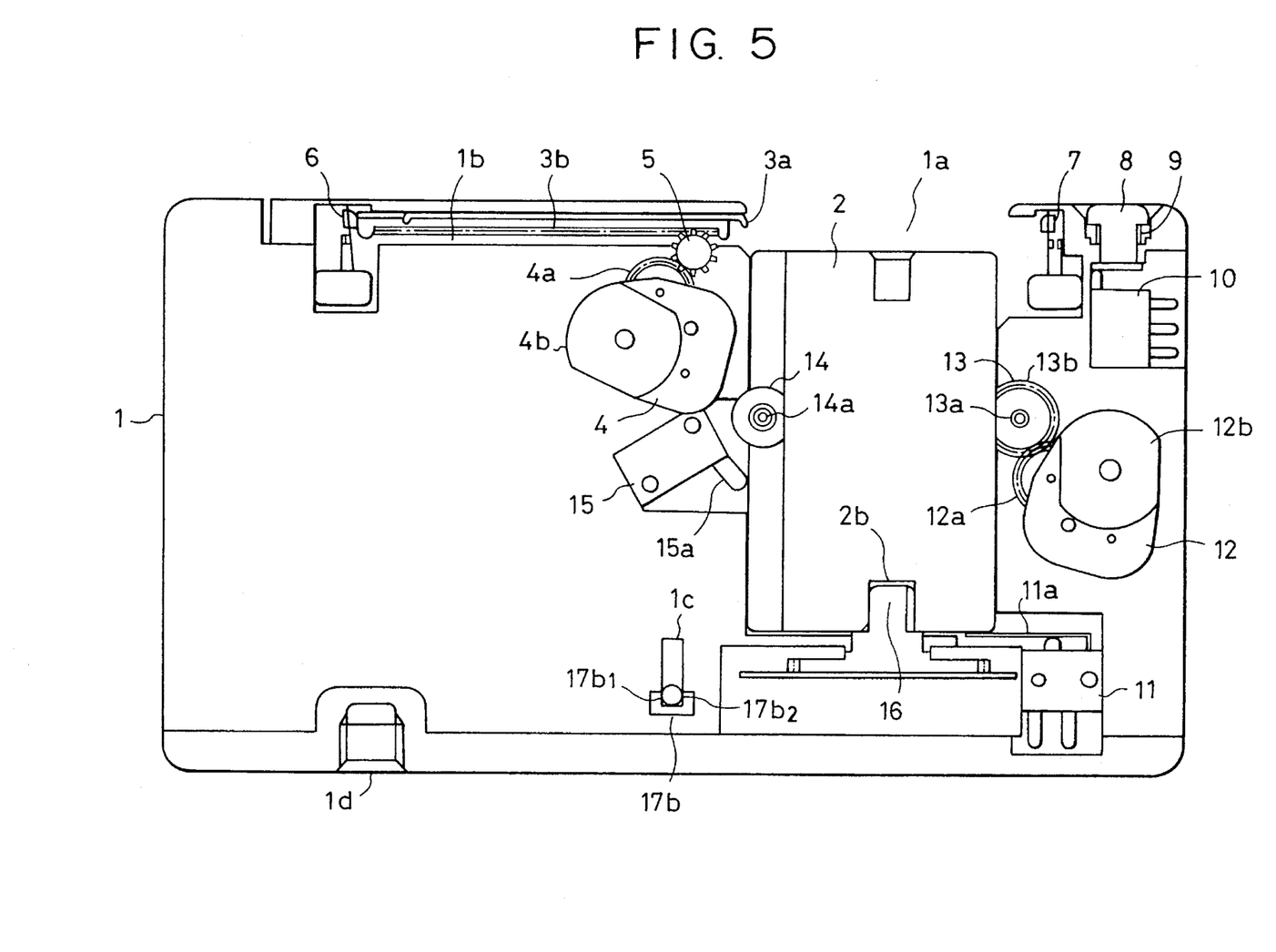
FIG. 5 illustrates a state in which the pulling-in of the film cartridge of the camera shown in FIG. 1 is terminated.

FIG. 5 shows a state in which the pulling-in of the film cartridge is terminated.

Figure 6:
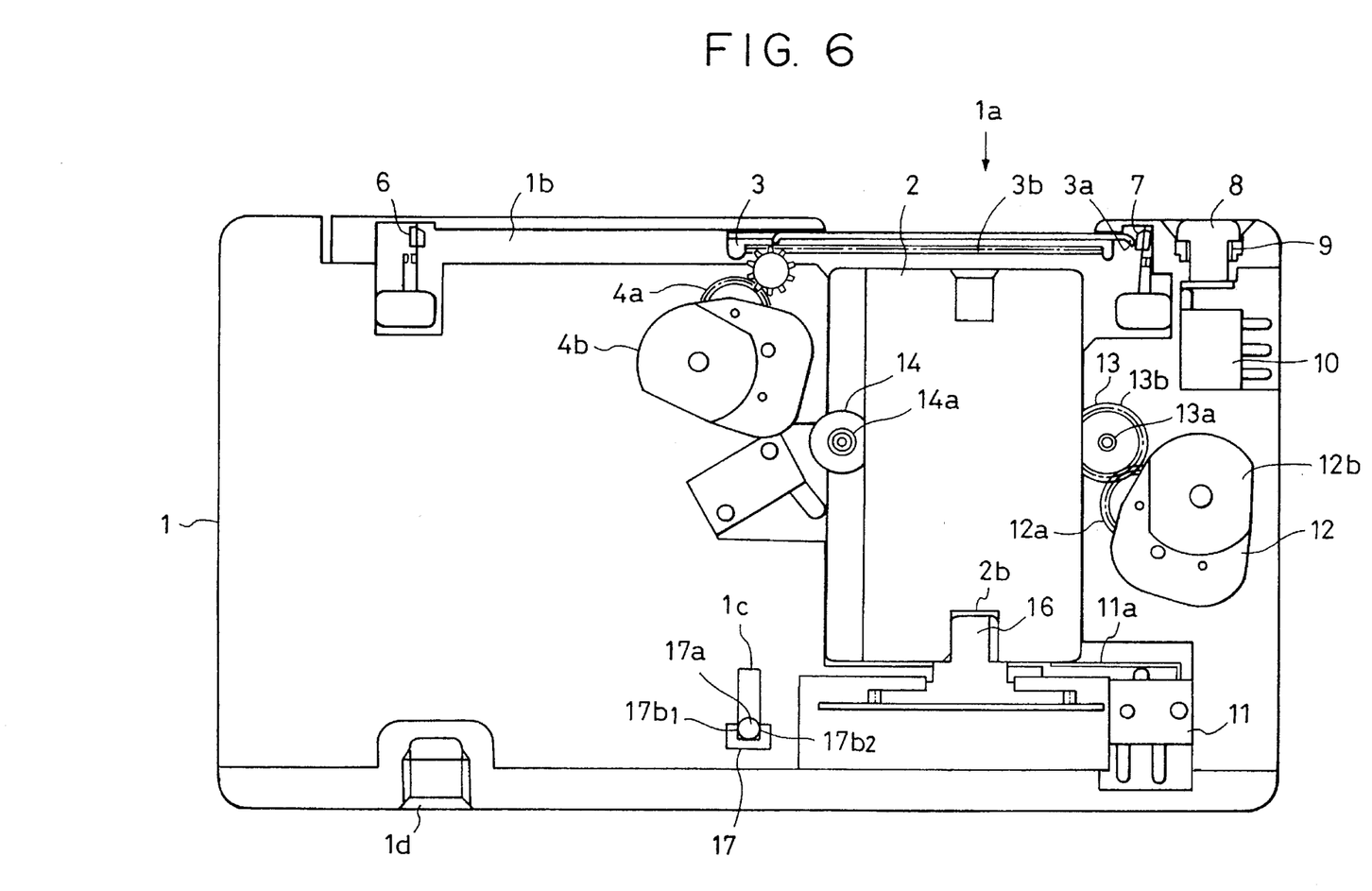
FIG. 6 illustrates a state in which the film cartridge of the camera shown in FIG. 1 is completely loaded.

FIG. 6 shows a state in which the film cartridge is completely loaded.

Figure 7:
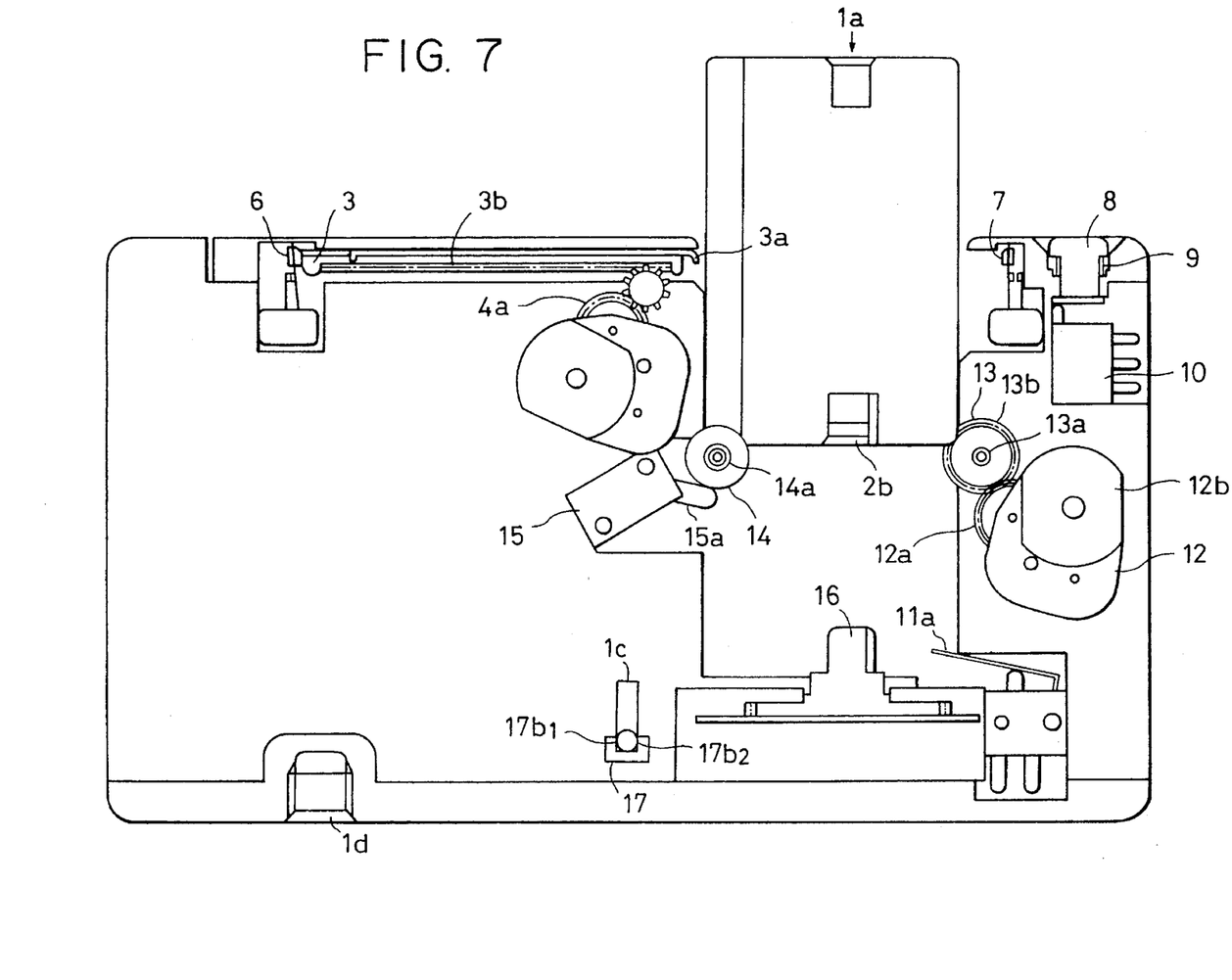
FIG. 7 illustrates a state in which the delivery of the film cartridge of the camera shown in FIG. 1 is terminated.

FIG. 7 shows a state in which delivery of the film cartridge is terminated.

Figure 8:
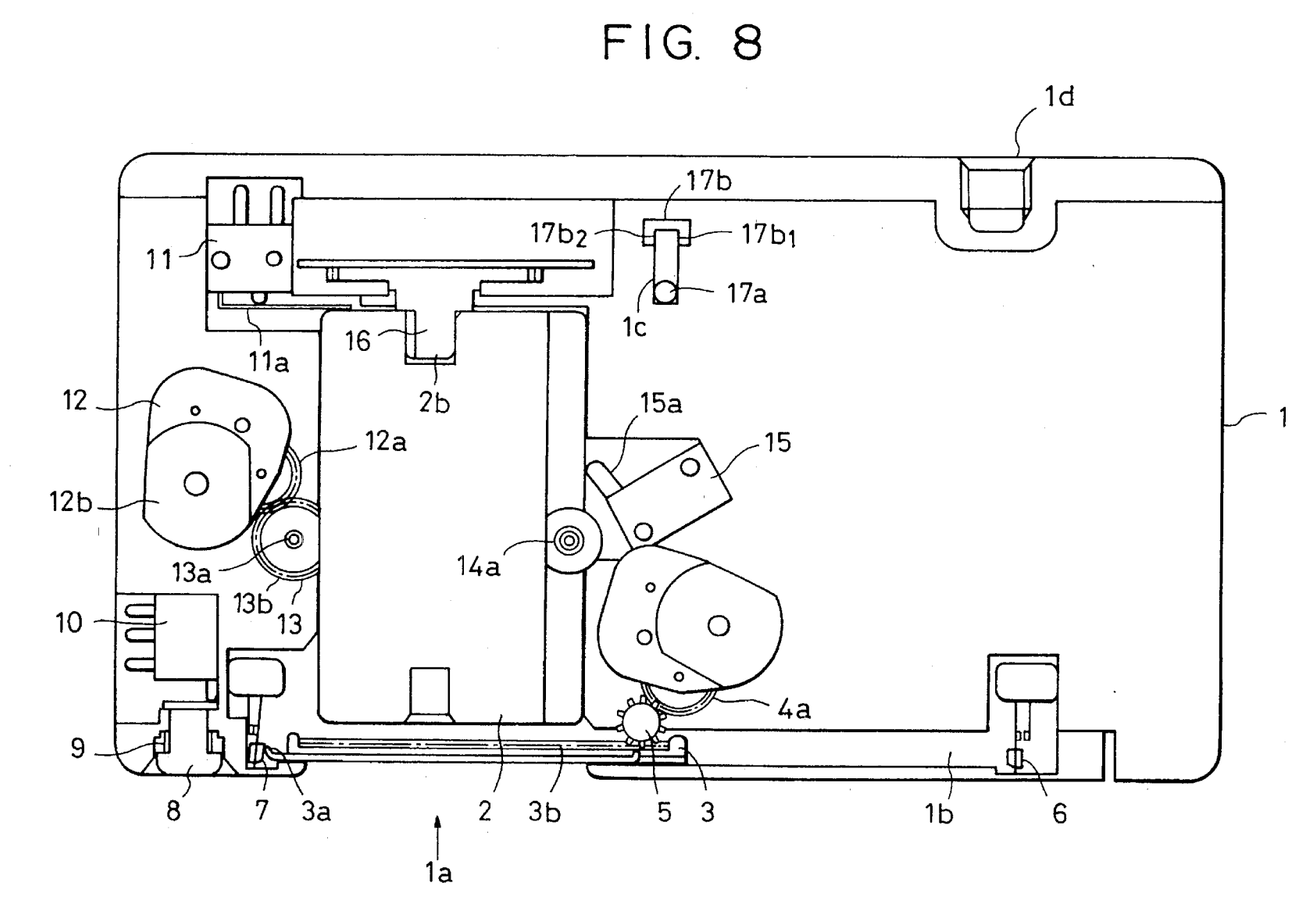
FIG. 8 illustrates a state in which the film cartridge insertion hole of the camera shown in FIG. 1 is facing downward.

FIG. 8 shows a state in which the film cartridge insertion hole 1a is facing downward.

The operation of the configuration as described above will be described with reference to the above drawings.

When the film cartridge 2 is inserted into the insertion hole 1a of the camera body 1 in the state shown in FIG. 1, the state is changed to the state shown in FIG. 4 in which the roller 13 does not rotate because the roller gear 13b is sufficiently decelerated but produces a slip between the film cartridge 2 and the roller 13. The guide roller 14 rotates clockwise.

When the film cartridge 2 is pressed in against a slight resistance of the two rubber rollers 13 and 14, the sensing arm 15a of the position sensing switch 15 is pressed in by the section 2a of the film cartridge 2 and the position sensing switch 15 is turned on whereby the CPU 100 senses the insertion of the film cartridge 2.

After sensing the insertion of the film cartridge 2, the CPU immediately transmits a normal rotation signal to the motor driver 102 so as to rotate the roller motor 12 normally. The normal rotation of the roller motor 12b causes the clockwise rotation of the output gear 12a and the counterclockwise rotation of the roller gear 13b and the roller 13. The film cartridge 2 is clamped by the roller 13 and the guide roller 14 so as to be pulled in the cartridge chamber. The position sensing switch 15 is turned on at all times while the film cartridge 2 is contained in the cartridge chamber.

When the film cartridge 2 is driven by the roller 13 and is lowered as it is guided by the guide roller 14, a fork 16 is guided to an engaging hole 2b of the film cartridge 2 by a chamfer of the cartridge 2 to be centered. When the cartridge 2 is further lowered, it is brought to a loading state as shown in FIG. 5 in which the arm 11a is pressed downwardly and the detection switch is turned on so as to transmit to the CPU as a signal of the fact that the film cartridge 2 is loaded at a predetermined position. The CPU immediately transmits a control signal to the motor driver 102 to stop the roller motor 12b.

While the roller motor 12b is stopped, the roller 13 cannot rotate because of the gear ratio of the decelerating system and the friction between the roller 13 and the film cartridge 2 is set sufficient enough to prevent the film cartridge 2 from falling out. Thus, the film cartridge 2 does not move even when it is turned upside down or vibrated.

Immediately after stopping the roller motor 12b, the CPU 100 transmits a normal rotation signal to the motor driver 101 to rotate the cover motor 4b in the normal direction. The normal rotation of the cover motor 4b causes the counterclockwise rotation of the output gear 4a and the clockwise rotation of the gear 5 so as to drive the slide cover 3 to the right (closing direction). By driving the slide cover 3 to the right, the opening switch 6 is turned off.

When the slide cover 3 is further driven to the right, it is brought to a loading state as shown in FIG. 6 in which the right end of the slide cover 3 turns on the closing switch 7 so as to transmit a closing of the slide cover 3 to the CPU 100. The CPU 100 stops the cover motor 4b through the motor driver 101.

Thereafter, completion of the loading of the film cartridge 2 is indicated on a display section (not shown), and a transporting motor (not shown) is driven to perform a film transport operation. When the film is held in a photographing position, it becomes possible to take photographs using a shutter device.

In order to take out the film cartridge 2 after all or part of the frames of the film have been used for photographing, the fork 16 firstly rewinds the film into the film cartridge 2 by means of a transporting system (not shown). When the film cartridge insertion hole 1a faces upward (in the state shown in FIG. 6), the steel ball 17a is at the lower end of the space 1c and the light receiving section $17b_2$ is shielded by the steel ball 17a. Thus, an output of the attitude sensing means 17 becomes Hi level. If a photographer pushes the ejection button 8 in this condition, the ejection switch 10 is turned on. The CPU 100 determines that the insertion hole 1a faces upward based upon the output of the AND circuit which inputs an ON signal (Hi) of the ejection switch 10 and Hi level of the attitude sensing signal and which then judges such signals logically, and reverses the cover motor 4b through the motor driver 101.

By a reverse rotation of the cover motor 4b, the slide cover 3 is driven to the left (opening direction). When the slide cover 3 moves to the left end to be completely opened, the opening switch 6 is turned on and the CPU 100 stops the cover motor 4b through the motor driver 101 (state of FIG. 5).

Following the stop of the cover motor 4b, the CPU 100 reverses the roller motor 12b so as to rotate the roller 13 clockwise. With the rotation in the direction (clockwise) opposite to that when the film cartridge 2 is inserted, the roller 13 allows the film cartridge 2 to elevate, and the position sensing switch 15 changes from the ON to OFF state when a part of the film cartridge 2 projects from the camera body 1. The CPU 100 judges the completion of the delivery of the film cartridge 2 and stops the roller motor 12b.

In this case, since the roller motor 12b stops with a slight overrun, the state of the film cartridge 2 is changed to the state shown in FIG. 7 in which the film cartridge 2 is released from the clamp by the roller 13 and the guide roller 14. Thus, the projected portion of the film cartridge 2 can be picked up by the fingers so as to take out the film cartridge 2.

Next, when the insertion hole 1a faces downward as shown in FIG. 8, the steel ball 17a moves to a position opposed to the photo-interrupter 17b, so as not to shield the light receiving section $17b_2$. Thus, the attitude sensing means 17 outputs the Lo level.

When the slide cover 3 is opened in this state to perform the delivery of the film cartridge 2, there is a fear that the film cartridge 2 will fall out. Thus, even if the photographer pushes the eject button to turn on the ejection switch 10, the ON signal (Hi) of the ejection switch 10 and the Lo level of the attitude sensing signal are input to the AND circuit, and the output thereof is Lo level. Therefore, the CPU 100 neither drives the cover motor 4b nor opens the slide cover 3.

In this way, the falling-out of the film cartridge 2 is prevented by prohibiting the opening operation of the slide cover 2 according to the Lo level output of the attitude sensing means 17.

Figure 9:
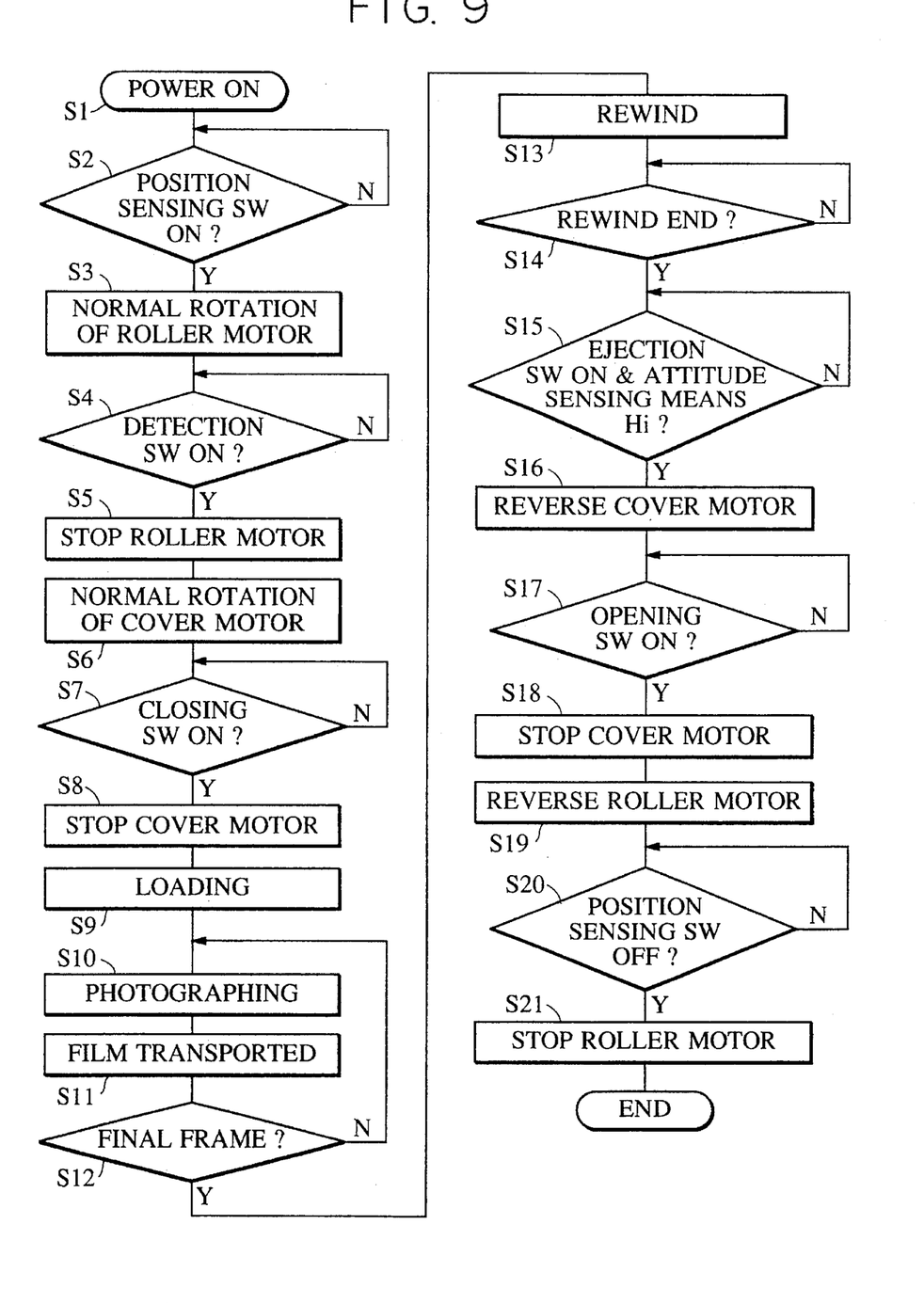
FIG. 9 is a flowchart showing the operation of the camera shown in FIG. 1.

FIG. 9 is a flowchart showing the operation of the CPU of FIG. 3.

An operation of a camera having a film cartridge loading device together with a falling-out prevention mechanism of the film cartridge 2 will now be described with reference to FIG. 9.

Firstly, the power switch (not shown) is turned on (step 1), and insertion of the film cartridge 2 is checked by whether or not the position sensing switch 15 is turned on (step 2). If the switch 15 is turned on, the roller motor is rotated in the normal direction to initiate the pulling-in operation of the film cartridge 2 (step 3).

The film cartridge 2 is lowered to check whether or not the detection switch 11 is turned on. If the switch 11 is turned on, the arrival of the film cartridge 2 to a predetermined position is judged (step 4), and then, the roller motor 12b is stopped to end the pulling-in of the film cartridge 2 (step 5).

Next, the cover motor is rotated in the normal direction so as to drive the slide cover 3 in the closing direction (step 6). When the slide cover 3 is completely closed, whether or not the closing switch 7 is turned on is checked (step 7). If the closing switch 7 is turned on, the cover motor 4b is stopped to end the cover closing operation (step 8).

A film is set to the first frame thereof by a transporting motor (not shown) (step 9). A photographing is carried out by lenses and a shutter (not shown) (step 10). One frame of the film is transported by the transporting motor (step 11).

Whether or not the final frame of the film is transported is checked (step 12). The operation of step 10 and step 11 is repeated until the final frame is transported. When the final frame is checked, the film is rewound by a rewinding motor (not shown) (step 13).

When the end of the rewind is confirmed (step 14), the orientation of the insertion hole 1a is judged from the ON signal of the ejection switch 10 and the AND output of the Hi level signal of the attitude sensing means 17 (step 15). If the insertion hole 1a faces downward, the cover motor 4b is not driven. If the insertion hole 1a faces upward, the cover motor 4b is reversed to initiate the cover opening operation of the slide cover 3 (step 16).

When the slide cover 3 reaches the left end and the opening switch is turned on (step 17), the cover motor 4b is stopped to end the cover opening operation (step 18).

Then, the roller motor 12b is reversed to initiate the delivery of the film cartridge 2 (step 19). When the position sensing switch 15 is changed to the OFF state, projection of the film cartridge 2 from the camera body by a predetermined length is judged (step 20) and the roller motor 12b is stopped to end the delivery of the film cartridge 2 (step 21).

In this embodiment, the orientation of the insertion hole 1a is sensed by the attitude sensing means 17, and when the insertion hole 1a faces downward, the driving of the cover motor 4b is prohibited to avoid opening of the slide cover 3. This eliminates the accidental falling-out of the film cartridge 2 and avoids the driving system falling into a state of overload.

The second embodiment of the present invention will be described.

Figure 10:
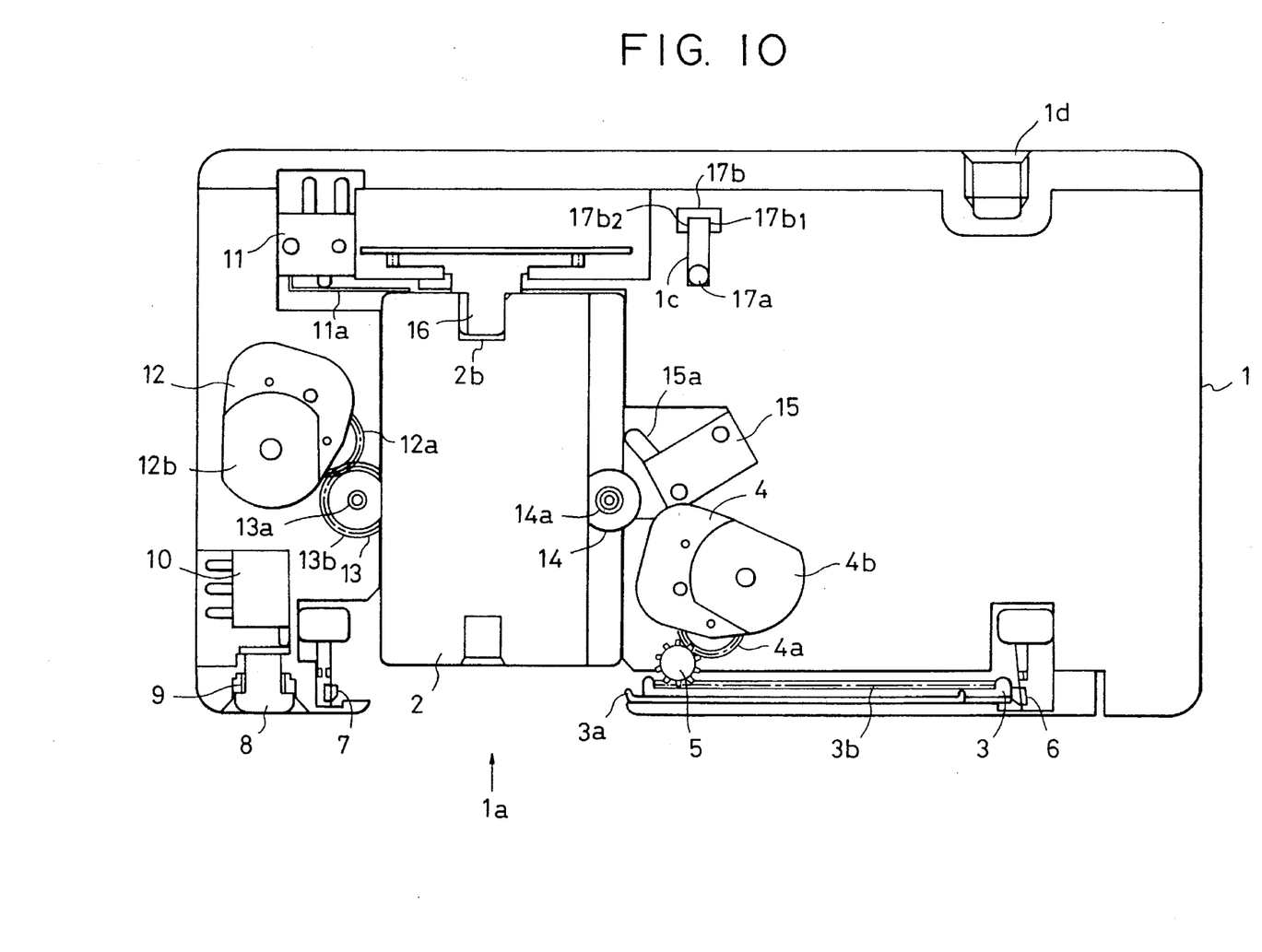
FIG. 10 is a cross-sectional view showing a camera having a film cartridge loading device according to the second embodiment of the present invention.

FIG. 10 is a cross-sectional view of a camera according to the second embodiment of the present invention.

This embodiment differs from the first embodiment in that the slide cover 3 is opened even if the insertion hole 1a faces downward, as shown in FIG. 10.

In this embodiment, the slide cover 3 is opened even if the insertion hole 1a faces downward, but thereafter the delivery of the film cartridge 2 is prohibited to prevent the falling-out of the film cartridge 2.

Since other constructions and operations are the same as those in the first embodiment, they are incorporated by reference in this embodiment, and only the difference between the first embodiment and the second embodiment will be described hereinafter.

When a photographer pushes the eject button 8 for the purpose of taking out the film cartridge 2, the ejection switch 10 is turned on and the CPU 100 reverses the cover motor 4 and rotates the output gear 4a counterclockwise through the motor driver 101.

The slide cover 3 is driven to the right by the gear 5. When the slide cover 3 is moved to the right end to turn on the opening switch 6, the CPU 100 stops the cover motor 4b through the motor driver 101 to bring about the state shown in FIG. 10.

At this time, the steel ball 17a is at the position opposite to the photo-interrupter 17b, whereby the light receiving section $17b_2$ is not shielded. Thus, the output of the attitude sensing means 17 is the Lo level. The CPU 100 prohibits the driving of the roller motor 12b with the Lo level signal of the attitude sensing means 17 so as to maintain the state shown in FIG. 10. In this condition, since the friction due to the roller 13 and the guide roller 14 is sufficient enough to prevent the film cartridge 2 from falling out, the film cartridge 2 does not fall out.

From this condition, when the camera body 1 is turned upside down so that the insertion hole 1a faces upward, the steel ball 17a moves to the position at which it shields the light receiving section $17b_2$ of the photo-interrupter 17b, and the output of the attitude sensing means 17 changes to the Hi level. Since the fear of falling-out of the film cartridge 2 is eliminated, the CPU 100 immediately reverses the roller motor 12b through the motor driver 102 to rotate the roller 13 clockwise.

When the roller 13 delivers the film cartridge 2 and a part of the cartridge 2 projects from the camera body 1, the position sensing switch 15 changes from ON to OFF state, and the CPU 100 stops the roller motor 12b to bring about the state shown in FIG. 7, thereby ending the taking-out of the film cartridge 2.

Figure 11:
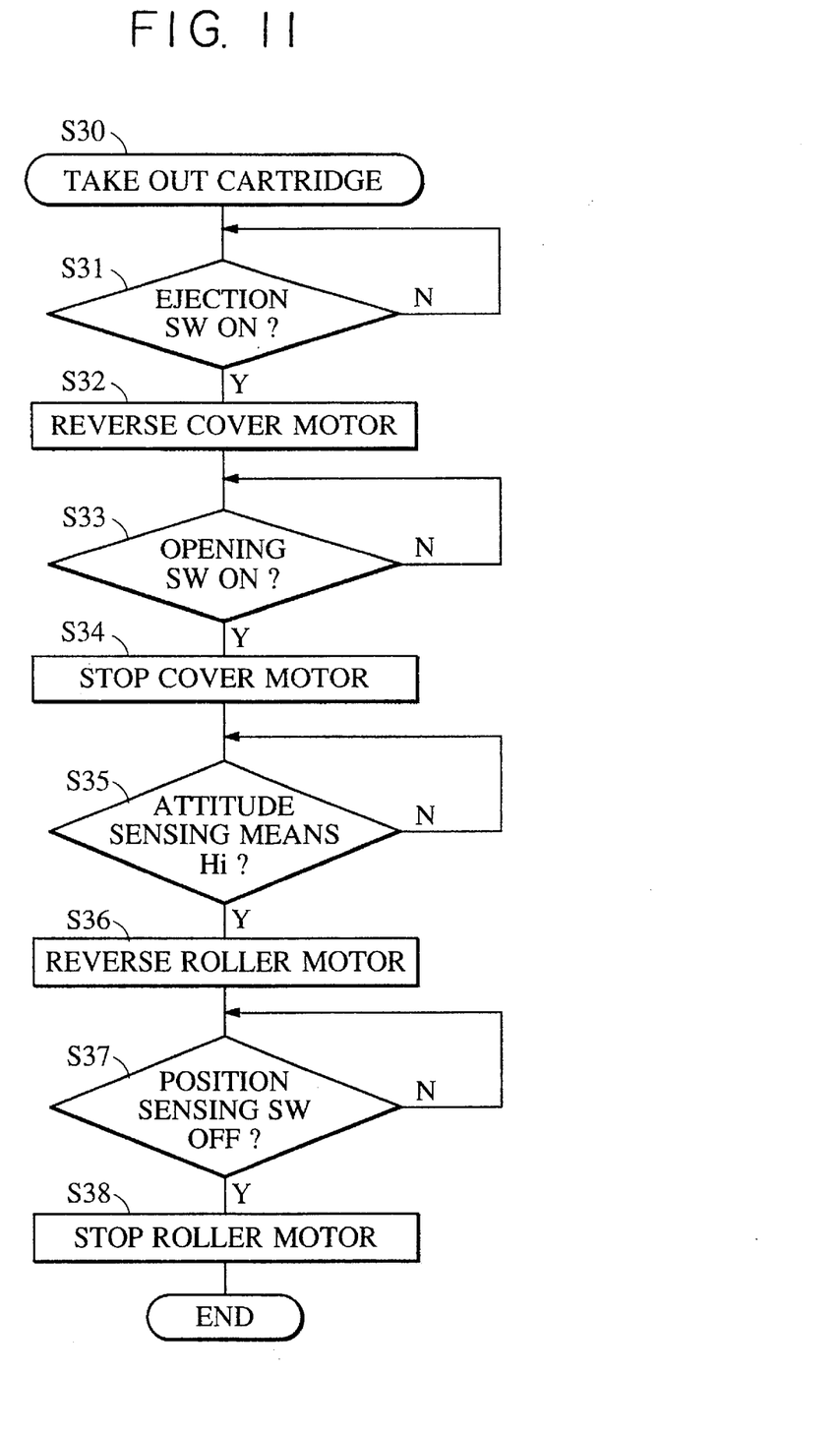
FIG. 11 is a flowchart showing the operation of the camera shown in FIG. 10.

FIG. 11 is a flowchart showing the operation of the CPU 100 according to the second embodiment of the present invention.

An operation of the camera will now be described with reference to FIG. 11.

When the ejection switch is turned on (step 31) to take out the film cartridge 2 (step 30), the cover motor 4b is reversed to initiate the opening of the slide cover 3 (step 32). When the opening switch 6 is changed to the ON state (step 33), the cover motor 4b is stopped to end the cover opening (step 34).

If the output of the attitude sensing means 17 is the Lo level, the driving of the roller motor 12b is prohibited. If the output of the attitude sensing means 17 is the Hi level (step 35), the roller motor 12b is reversed to initiate the delivery of the film cartridge 2 (step 36).

When the position sensing switch 15 is changed to the OFF state (step 37), the CPU 100 determines that the film cartridge 2 projects from the camera body 1 by a predetermined length, and stops the roller motor 12b to end the delivery of the film cartridge 2.

According to the second embodiment as described above, even though the slide cover 3 is opened, the driving of the roller motor 12b is prohibited by the sensing of the attitude sensing means 17 when the insertion hole 1a faces downward so as to hold the film cartridge 2. Thus, the falling-out of the film cartridge 2 can be prevented.

In the first and second embodiments as described above, there is described the attitude sensing means 17 which detects the position of the steel ball 17a of the sensing material moving within the space 1c by means of the photo-interrupter 17b. However, the sensing material is not limited to the steel ball. Any material capable of shielding the light, such as a fluid material, a particulate material and the like moving within the closed space 1c may be used as the sensing material instead of the steel ball 17a. It is possible to constitute the detection system by a magnetic detector or an electric detector in addition to an optical detector such as a photo-interrupter 17b.

According to the embodiments as described above, the loading or ejection of the cartridge is performed by means of the rollers. However, any construction in terms of loading or ejection of the cartridge is applicable to the present invention. For example, a construction is applicable in which the cartridge is held to be integrally slid.

According to the embodiments as described above, an operation corresponding to the attitude of the camera is performed when ejecting the cartridge. However, this may be applied to the loading of the cartridge.

According to the embodiments as described above, the opening of the cover of the cartridge chamber and ejection of the cartridge are prohibited as means for preventing the falling-out of the cartridge. However, the present invention is not limited thereto, and any means can be applied to the present invention so long as it varies the operation relating to at least either of loading or ejection of the cartridge, such that the ejection of the cartridge is stopped halfway.

According to the embodiments as described above, the cartridge is loaded or ejected from above of the camera. However, the present invention is not limited thereto. For example, the cartridge may be loaded or ejected from below or the side of the camera.

According to the embodiments as described above, the cartridge is loaded or ejected axially. However, the present invention is not limited thereto.

And, an image recording medium other than a film is applicable to the present invention.

Furthermore, a cartridge of the form other than that described in the above embodiments, a cartridge having an image recording medium other than the film and further, other types of cartridges and a loading of substances other than the cartridge such as a battery are applicable to the present invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The individual components shown in schematic or block form in the Drawings are all well-known in the camera arts and their specific construction and operation are not critical to the operation or the best mode for carrying out the invention.

Each of the embodiments described above or technical elements thereof of the present invention can be combined if needed.

It is possible for all or part of the construction of the claims or the embodiments of the present invention to make one apparatus. It is also possible for them to be combined with other apparatus. It is further possible for them to become components making up an apparatus.

Furthermore, the present invention is applicable to various types of cameras, such as a single-lens reflex camera, a lens shutter camera, a video camera and the like. The present invention is also applicable to optical instruments and other apparatuses other than the cameras, and further, to an apparatus to be applied to those cameras, optical instruments and other apparatuses or components thereof.

What is claimed is:

1. An apparatus adapted for an image recording medium cartridge, comprising:
    (A) a first device which automatically performs an operation relating to at least one of loading of the cartridge into and unloading of the cartridge from a cartridge chamber; and
    (B) a second device responsive to a state of orientation of the cartridge chamber for varying an operation of said first device.

2. An apparatus according to claim 1, wherein said image recording medium comprises a film.

3. An apparatus according to claim 1, wherein said first device comprises a motor.

4. An apparatus according to claim 1, wherein said first device comprises means for using electrical energy as a source of driving.

5. An apparatus according to claim 1, wherein said first device comprises a third device which operates a cover of the cartridge chamber.

6. An apparatus according to claim 5, wherein said second device comprises means for preventing said third device from operating.

7. An apparatus according to claim 1, wherein said first device comprises a third device which opens a cover of the cartridge chamber.

8. An apparatus according to claim 7, wherein said second device comprises means for preventing said third device from operating.

9. An apparatus according to claim 1, further comprising:
   (C) said cartridge chamber; and
   (D) a cover of said cartridge chamber, wherein said first device comprises means for operating said cover.

10. An apparatus according to claim 1, wherein said first device comprises a third device which moves the cartridge.

11. An apparatus according to claim 10, wherein said second device comprises means for preventing said third device from operating.

12. An apparatus according to claim 1, wherein said first device comprises a third device which unloads said cartridge from said cartridge chamber.

13. An apparatus according to claim 12, wherein said second device comprises means for preventing said third device from operating.

14. An apparatus according to claim 1, wherein said second device comprises means for preventing said first device from operating.

15. An apparatus according to claim 1, wherein said second device comprises means for preventing said first device from operating when the cartridge is loaded or unloaded downwardly.

16. An apparatus according to claim 1, wherein said second device comprises means for determining a loading or unloading direction of the cartridge.

17. An apparatus according to claim 1, wherein said apparatus comprises a camera.

18. An apparatus adapted to use an image recording medium cartridge, comprising:
   (A) a first device which automatically performs an operation relating to at least one of loading of the cartridge into and unloading of the cartridge from a cartridge chamber; and
   (B) a second device responsive to a state of orientation of the cartridge chamber for varying an operation of said first device.

19. A unit adapted for at least one of a camera or an apparatus adapted to use an image recording medium cartridge, comprising:
   (A) a first device which automatically performs an operation relating to at least one of loading of the cartridge into and unloading of the cartridge from a cartridge chamber; and
   (B) a second device responsive to a state of orientation of the cartridge chamber for varying an operation of said first device.

* * * * *